(12) United States Patent
Thomson

(10) Patent No.: US 10,451,755 B2
(45) Date of Patent: Oct. 22, 2019

(54) PROCESSING WAVEFIELD DATA INCORPORATING LARGE TIMESTEPS AND UPSCALED MEDIUM PROPERTIES

(71) Applicant: WESTERNGECO L.L.C., Houston, TX (US)

(72) Inventor: Colin Thomson, Cambridge (GB)

(73) Assignee: WESTERNGECO L.L.C., Houston, TX (US)

(*) Notice: Subject to any disclaimer, the term of this patent is extended or adjusted under 35 U.S.C. 154(b) by 230 days.

(21) Appl. No.: 14/419,205

(22) PCT Filed: Jul. 31, 2013

(86) PCT No.: PCT/IB2013/001690
§ 371 (c)(1),
(2) Date: Feb. 2, 2015

(87) PCT Pub. No.: WO2014/020416
PCT Pub. Date: Feb. 6, 2014

(65) Prior Publication Data
US 2015/0192686 A1 Jul. 9, 2015

(30) Foreign Application Priority Data
Jul. 31, 2012 (GB) .................................. 1213578.6

(51) Int. Cl.
*G01V 1/30* (2006.01)

(52) U.S. Cl.
CPC ............ *G01V 1/30* (2013.01); *G01V 2210/67* (2013.01); *G01V 2210/679* (2013.01)

(58) Field of Classification Search
CPC . G01V 1/30; G01V 2210/679; G01V 2210/67
(Continued)

(56) References Cited

U.S. PATENT DOCUMENTS 5,193,077 A * 3/1993 Weiglein ................ G01H 3/005
181/112
2010/0027376 A1 2/2010 Washbourne et al.
(Continued)

FOREIGN PATENT DOCUMENTS

GB 2478574 A 9/2011
WO WO2012/128873 A2 9/2012

OTHER PUBLICATIONS

Chung, et al., "Multiscale finite element modeling of acoustic wave propagation", Jan. 1, 2011, SEG Technical Program Expanded Abstracts 2011, pp. 2898-2903.
(Continued)

*Primary Examiner* — Daniel L Murphy

(57) ABSTRACT

Processing data representing a wavefield propagating through a medium by defining, based on one or more properties of a region of the medium and of the wavefield therein, a desired timestep and a desired spatial step for a discrete operator. Discrete seed operators having an initial timestep and an initial spatial step less than the desired timestep and the desired spatial step are then defined, and these seed operators are compounded to obtain an operator having a greater timestep and upscaled to obtain an operator having a greater spatial step. The compounding and upscaling are repeated until an operator having the desired timestep and the desired spatial step is obtained. The operator having the desired timestep and the desired spatial step may be applied to the data representing the wavefield propagating through a medium to propagate the data backwards in time to recreate the wavefield at earlier times.

25 Claims, 10 Drawing Sheets

(58) Field of Classification Search
USPC .............................................. 367/14, 15, 38
See application file for complete search history.

(56) References Cited

U.S. PATENT DOCUMENTS

2011/0218737 A1  9/2011  Gulati
2012/0010865 A1  1/2012  Benson

OTHER PUBLICATIONS

Wards, et al., "Phase-shift time stepping for wavefield propagation", Jan. 1, 2010, SEG Technical Program Expanded Abstracts 2010, pp. 2988-2992.
Muralidharan et al, "Dynamic Compound Wavelet Matrix Method for Multiphysics and Multiscale Problems," (2008) Physical Review E 77. 14 pages.
Frantziskonis et al, "Wavelet Methods for Analysing and Bridging Simulations at Complementary Scales—The Compound Wavelet Matrix and Application to Microstructure Evolution," Modelling Simul. Mater. Sci. Eng. vol. 8 (2000), pp. 649-664.
Mirchandani et al., "Multiresolution in Multiscale: A New Role for Wavelets," School of Engineering, Univ. of Vermont, (2009) DSP & SPE Workshop, 6 pages.
Lekien et al, "Tricubic Interpolation in Three Dimensions," International J. for Numerical Methods in Eng. (2005) vol. 63 pp. 455-471.
Combined Search and Examination Report for International Patent Application No. GB1213578.6, dated Nov. 22, 2012, 10 pages.

\* cited by examiner (a)

(b)

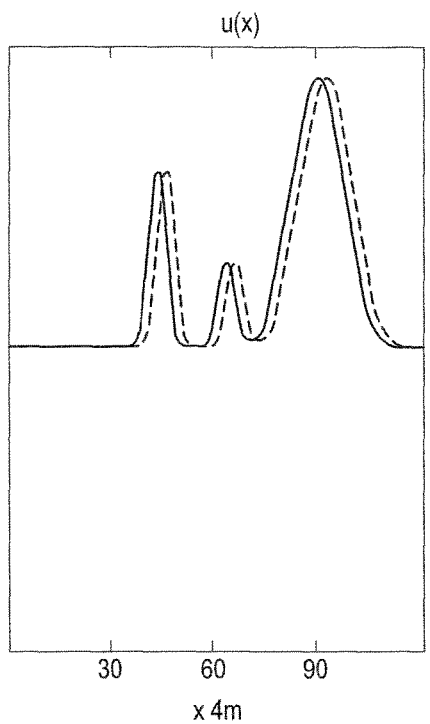 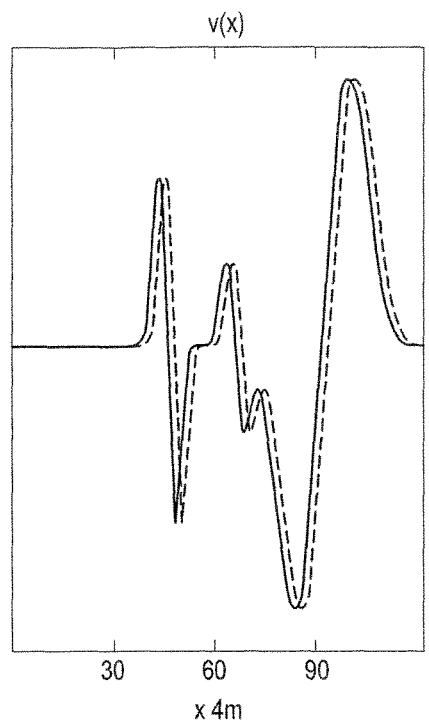
Fig. 6(a)    Fig. 6(b)
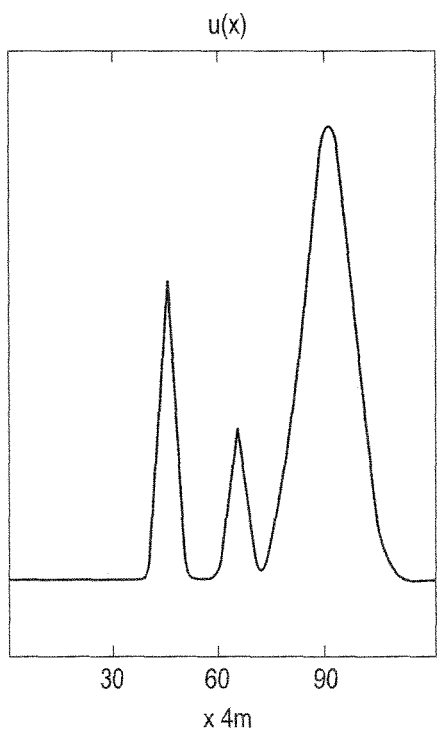 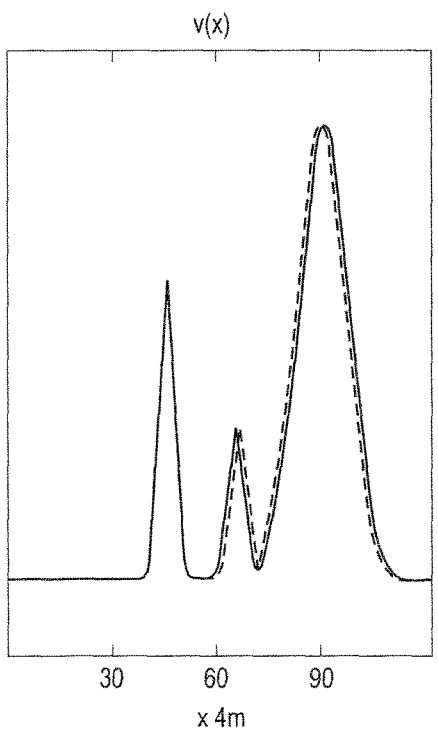
Fig. 7(a)    Fig. 7(b)

PROCESSING WAVEFIELD DATA INCORPORATING LARGE TIMESTEPS AND UPSCALED MEDIUM PROPERTIES

This application is the U.S. National Stage Application of International Application No. PCT/IB2013/001690, filed Jul. 31, 2013, which claims priority to GB Application No. 1213578.6, filed Jul. 31, 2012.

BACKGROUND

Embodiments of the present invention relate to a method of processing data representing a wave propagating through a medium, in particular but not by way of limitation to a method of generating operators having a large timestep and embodying fine-scale medium properties. Embodiments of the present invention may be applied in the processing of seismic data, but the invention is not limited to this and embodiments of the present invention may also be applied to, for example, acoustic or electromagnetic imaging techniques, non-destructive testing, or medical imaging. Embodiments of the present invention also relates to a corresponding apparatus and computer-readable medium.

Modeling elastic wave propagation is the engine behind high-end seismic processing such as imaging and full-waveform inversion. In imaging, for example, seismic field data are back propagated into a model of the Earth by reversing the sense of time, as in reverse-time migration (RTM), and the method of this invention may be used for this purpose, especially where the Earth model contains complicated fine structure.

Prominent approaches to seismic modeling are the finite-difference (FD) method and the extended finite-element methods (spectral element (SEM) and discontinuous Gelerkin (DG)). While quite different in many ways, those approaches have in common the use of timesteps which are very small compared to the wave period. For example, in a finite difference method, the domain is partitioned in space to give a mesh or grid of points $x_0, x_1 \ldots x_J$, separated by a spatial sampling interval $\Delta x$ and is also partitioned in time to give a mesh or grid of time points $t_0, t_1 \ldots t_N$, separated by a time sampling interval or "timestep" $\Delta t$. A differential equation may then be converted to a series of difference equations that define a value of a quantity at a particular timepoint and a particular spatial point in terms of the values of that quantity at previous timepoints and/or previous spatial points. The value of the timestep is typically limited by a stability criterion and complicated spatial variations of the medium on a scale less than $\Delta x$ are not admitted.

SUMMARY

A first aspect of the present invention provides a method of processing data representing a wavefield propagating through a medium, the method comprising:
(a) defining a desired timestep and a desired spatial step for a discrete operator, the desired timestep and desired spatial step being based on one or more properties of a region of the medium and of the waves therein;
(b) defining a plurality of discrete seed operators having an initial timestep and an initial spatial step less than the desired timestep and the desired spatial step respectively;
(c) compounding two or more of the seed operators to obtain a discrete operator having a timestep greater than the initial timestep;
(d) upscaling the operator obtained in step (c) to obtain a spatial step greater than the initial spatial step;
(e) repeating steps (c) and (d) until a operator having the desired timestep and the desired spatial step is obtained; and
(f) applying the operator having the desired timestep and the desired spatial step to the data representing the wavefield propagating through a medium to propagate the data backwards in time thereby to recreate the wavefield at one or more earlier times.

Compounding two or more of the seed operators may comprise compounding two or more of the seed operators to obtain a discrete operator having a timestep equal to n times the initial timestep Upscaling the operator may comprise upscaling the operator to obtain a spatial step equal to n times the initial spatial step. The value of n may be 2. (By repeating the compounding and upscaling, the time step and spatial step may be increased by any desired factor. In one embodiment described below the compounding and upscaling are repeated 14 times so that the time step and spatial step are increased by a factor of 2^14=16,384.)

Defining the seed operators may comprise defining two or more regions in the medium, and defining a respective seed operator for each region.

The width of a region may be selected to be such that at least one property of the medium is substantially homogenous over the region.

The regions may be defined such that at least one property of the medium has a first value in one region and a second, different value in a second region adjacent to the first region.

The at least one property of the medium may include a wave propagation velocity.

The method may comprise using the recreated wavefield in determining one or more wavefield parameters relating to one or more physical properties of the medium.

The wavefield may be a seismic, acoustic, or electromagnetic wavefield.

The method may further comprise acquiring the data representing the wavefield propagating through a medium. Alternatively the operator may be applied to pre-existing data that are retrieved from storage.

In one embodiment, values of the wavefield are known at a plurality of wavefield sampling points, and at least one of the discrete seed operators is defined by:
  estimating values of the wavefield at points different from the wavefield sampling points by interpolation from values of the wavefield at wavefield sampling points; and
  determining a respective weight for each wavefield sampling point that corresponds to a discrete seed operator.

A second aspect of the present invention provides a method of defining a seed operator by:
  estimating values of the wavefield at points different from wavefield sampling points at which values of the wavefield are known by interpolation from values of the wavefield at wavefield sampling points; and
  determining a respective weight for each wavefield sampling point that corresponds to a discrete seed operator.

In the first or second aspect, the interpolation may comprise local tricubic interpolation.

In the first or second aspect, the method may be a processor-implemented method.

A third aspect of the present invention provides a computer-readable medium containing instructions that, when executed by a processor, cause the processor to carry out a method of the first aspect or of the second aspect.

A fourth aspect of the present invention provides a corresponding apparatus.

The invention also provides a method of processing data representing a wavefield propagating through a medium, the method comprising:
 (a) defining a desired timestep and a desired spatial step for a discrete operator, the desired timestep and desired spatial step being based on one or more properties of a region of the medium and of the waves therein;
 (b) defining a plurality of discrete seed operators having an initial timestep and an initial spatial step less than the desired timestep and the desired spatial step respectively;
 (c) compounding two or more of the seed operators to obtain a discrete operator having a timestep greater than the initial timestep;
 (d) upscaling the operator obtained in step (c) to obtain a spatial step greater than the initial spatial step; and
 (e) repeating steps (c) and (d) until an operator having the desired timestep and the desired spatial step is obtained.

When data representing a wavefield propagating through a medium are processed, the intention is normally to obtain information about one or more properties of the medium. In the case of processing seismic data, as an example, seismic energy is directed into the earth's interior and propagates as a wavefield through the earth's interior. At a later time the wavefield is sampled (or, in other words, seismic data are acquired) at one or more locations within the earth or at the earth's surface. The seismic data acquired at a location depend on characteristics of the seismic energy originally directed into the earth, and on the wavefield propagation properties of the earth's interior along the propagation path of the seismic wavefield to the location where the data were acquired. (The wavefield propagation properties of the earth's interior is sometimes referred to as the "Earth model").

The problem faced in seismic data processing is to determine or estimate the Earth model from knowledge of acquired seismic data and from knowledge of the seismic energy originally directed into the earth. One method of estimating the earth model requires modeling backwards in time, to go from an observed effect (eg acquired seismic data) to the known cause of that effect (eg the seismic energy directed into the earth at an earlier time), in order to determine an earth model in which this modeling backwards in time from the observed effect accurately leads to the known cause. (In contrast, a "forward-time modeling" problem is usually much easier to solve—if the medium properties are known it is straightforward to model the effect at later times resulting from a disturbance at an initial time.) To be of use, the seismic data processing method must provide accurate representations of the earth's interior, which may include complex geological structures. Furthermore, typical seismic data sets contain huge amounts of data, so that efficient processing techniques are needed—and one way to improve the efficiency is to increase the timestep and so reduce the number of steps required to model backwards through a known time period. Similar considerations apply in other imaging applications, such as medical imaging or non-destructive testing.

When an operator having a desired timestep and the desired spatial step has been obtained by a method of the invention, it may be applied to data such as seismic field data (in an example where the invention is applied in seismic data processing, where "field data" are actual data acquired in a seismic survey). The field data—i.e., sampled values of the seismic wavefield acquired at times after the start of the survey—may be back-propagated into the Earth model by reversing time, and this "reverse time" modeling may be carried out by any machine that can carry out forward-time modeling (since the wave equation is reversible in time). This recreates the wavefield at earlier times (i.e., at times before the wavefield was sampled), and ultimately should lead to the recreation of the seismic energy that was directed into the earth at the start of the survey. This constraint that the reverse-time modeling should recreate the seismic energy that was directed into the earth at the start of the survey can be used to estimate the Earth model—if the effect of reverse time modeling using a particular estimate of the Earth model does not accurately recreate the seismic energy that was directed into the earth at the start of the survey, this shows that that particular estimate of the Earth model is inaccurate.

High-end seismic processing depends upon wavefield modeling and this invention provides a new time-domain modeling method built upon homogeneous-medium 'seed' operators. A compounding process beginning with these seeds leads to a method for inhomogeneous media which:
 (i) has the attractive regular-grid characteristic of the finite-difference method;
 (ii) allows large timesteps; and
 (iii) uses operators that contain the effects of fine-scale or sub-grid Earth structure, because these operators are built by a process of scale doubling (upscaling).

The method opens the way to a new level of wavefield-processing flexibility. This is partly because solution operators corresponding to significant portions of an Earth model may be computed and stored for future use. The method is ultimately aimed at efficient yet accurate simulation of vector waves in three dimensions, including the effects of elastic anisotropy.

The present invention thus makes it possible to develop an operator having a larger timestep than previous operators. The timestep is determined not by a stability criterion, but by properties of the medium through which the wavefield is propagating, such as its inhomogeneity. The realisation that medium inhomogeneity should control discrete modeling operators provides significant advantages for this invention, as it should lead to new degrees of flexibility, accuracy and efficiency.

A method in accordance with an embodiment of the present invention may be applied to wave problems, where the basic homogeneous-medium Green function or fundamental solution is known. Embodiments of the present invention may be founded on three ideas.
 1. A continuous medium is locally homogeneous when viewed at a sufficiently fine scale.
 2. A continuous medium can seem rough when the wavelength is large in comparison with the width of zones in which the properties of the medium change substantially (such as a high-gradient zone, that is a zone in which the rate of change (gradient) of the wave velocity is high). The spatial sampling interval of such long waves will be called the coarse scale; it is some fraction of their wavelength (e.g. 10%).
 3. A simple interpolation scheme, for example a local-cubic interpolation scheme, suffices for the long waves at the coarse scale.

The first idea leads to seed operators based on the analytical Green function. The third idea means that at the fine scale the interpolation scheme is certainly applicable and the seed operators are built using it. The second idea leads to a process of compounding and scale doubling which ends with the coarse-scale operators.

The coarse-scale operators are compatible with finite-difference methods as they use a regular grid.

The underlying interpolation method of an embodiment of the present invention may also be applied to boundary operators. Embodiments of the present invention include among other things new features such as the volume nature of the operators, flexible timestepping and perhaps most importantly the spatial upscaling so that the operators gridded on the coarse scale embody fine-scale (sub-grid) structure of the medium.

An upscaling step can also be applied to boundary operators when they are considered as part of a larger boundary-zone operator incorporating sub-grid structure near the boundary.

BRIEF DESCRIPTION OF THE DRAWINGS

Embodiments of the invention will be described by way of illustrative examples with reference to the accompanying figures, in which:

FIGS. 6(a) and 6(b) illustrate output of operators obtained by a method in accordance with an embodiment of the present invention;

FIGS. 7(a) and 7(b) illustrate output of operators obtained by a method in accordance with an embodiment of the present invention;

Figure 1:
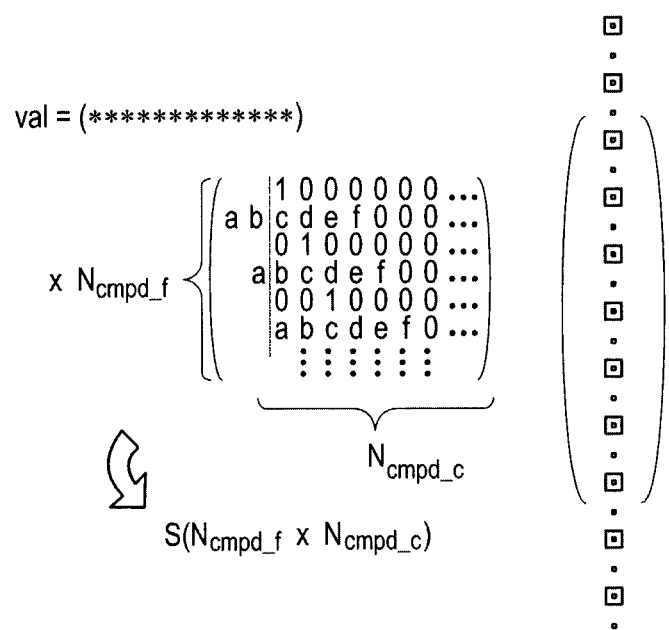
FIG. 1 shows a data resampling step, in accordance with an embodiment of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiment(s) only, and is not intended to limit the scope, applicability or configuration of the invention. Rather, the ensuing description of the exemplary embodiment(s) will provide those skilled in the art with an enabling description for implementing an exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The invention will be described with reference to embodiments relating to seismic wavefield processing. This is by way of example only, and the invention may be applied generally to any situation in which a wavefield propagates through a medium.

Background Wave Theory

The theory will be described for scalar waves, though the method applies for elastic waves.

The wavefield is u(x,t) and its time derivative or "velocity" is v(x,t), where x is a space coordinate and t is time. For a homogeneous medium with wavespeed $\alpha$, these wavefields are related to their values at initial time zero $u_0(x)$ and $v_0(x)$ by $$u(x,t)=\int \alpha^{-2} u_0(y) \partial_t G(x,t,y) dy + \int \alpha^{-2} v_0(y) G(x,t,y) dy$$

and $$v(x,t)=\int \alpha^{-2} u_0(y) \partial_t^2 G(x,t,y) dy + \int \alpha^{-2} v_0(y) \partial_t G(x,t,y) dy$$

where $G(x,t,y)=\delta(t-r/\alpha)/4\pi r$, $r=|x-y|$, is the 3D Green function.

The above formulas are related to Huyghens' principle and may be shown to be consistent with Green's theorem expressing the field u at the point x in terms of its value and its normal derivative on a spherical boundary at distance $r=\alpha t$. In other words, the volume integrals above are equivalent to operators which act on $u_0$ and $v_0$ on the spherical boundary in order to separate the incoming and outgoing waves, and which propagate the former to the internal point x of the homogeneous medium.

Essentially the same formulas apply for the elastic case, including general anisotropy. The difference is that the Green function itself is then represented by another integral representing a sum of weighted plane waves. In fact, for a homogeneous medium the solution to the initial-value problem may be conveniently written using Fourier transforms, sums of plane waves, and that representation may be used in another description of the method.

Discretization Using Local Interpolation: Homogeneous-Medium Seed Operators

In practice the initial wavefields and all later wavefields are given as a grid, preferably a regular grid, of samples. For example, in a seismic survey the wavefield is sampled only at locations where a seismic sensor is present, so that the survey provides values for the wavefield at a number of discrete points in space.

It is possible to define cells, such that each vertex of a cell is at a location where the wavefield has been sampled—so that values of the wavefield are known at each vertex of the cell. In the case of a regular 2-D grid of sampling locations each cell would be a square, and in the case of a regular 3-D grid of sampling locations each cell would be a cube. Within the interiors of a cell the wavefield value has not been sampled and so is not known exactly, but may be estimated by interpolation from the values of the wavefield at each vertex of that cell. One known interpolation method is tricubic interpolation, in which the value of the wavefield at a point in the cell is interpolated from the value of the wavefield at each vertex of that cell and from the values of derivatives of the wavefield at each vertex of that cell. However, other interpolation methods are known and may be used.

In practice it may be case that the points at which a wavefield is sampled do not lie exactly on a regular grid. However, techniques are known for "regularising" data sampled at locations that are not regular grid. The invention will therefore be described on the assumption that the wavefield has been sampled at locations arranged on a regular grid. If this assumption is not correct the invention may still be applied, provided that the data are first "regularised" by use of any suitable technique.

Also, in a practical seismic survey each seismic sensor samples the wavefield at regular time intervals, with each two samplings being separated by a time sampling interval.

Figure 8:
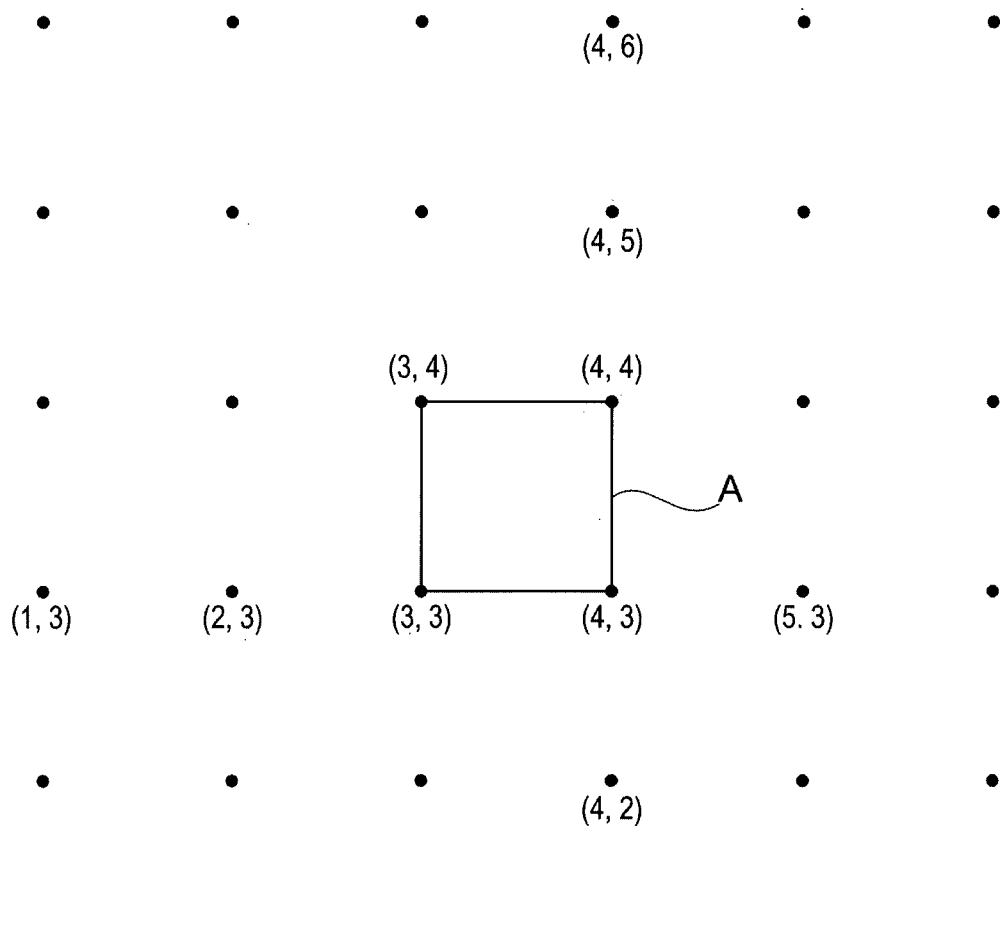
FIG. 8 is a schematic illustration of estimating the value of a wavefield the value of which has been measured at discrete points, in accordance with an embodiment of the present invention.

Lekien & Marsden, Journal of Numerical Methods and Engineering, Vol. 63 pp 455-471 (2005) describe a tricubic interpolation method, which requires several wavefield gradients at the eight vertices of each 3D cell, as well as the fields themselves at the cell vertices, to estimate the value of the wavefield at a point within the cell (i.e., away from the cell vertices). In one implementation used here, these required gradients are represented by fourth-order finite differences that use 4 surrounding wavefield samples (a "fourth-order" interpolation technique with an interpolation step size of $\delta x$ provides results that are accurate to terms in $(\delta x)^4$). As a result, within each cell of the regular grid, the wavefield is defined as a tricubic function and its coefficients depend linearly in an explicitly known way on the wavefield samples of a corresponding 6×6×6-point extended cell. That is, in the 2-D example of FIG. 8, the values of wavefield in the cell A having vertices at sampling points (3,3), (43), (3,4) and (4,4) are interpolated from the values of the wavefield and the derivatives at each of the sampling points (3,3), (4,3), (3,4) and (4,4). However, the derivative along the x-axis at sampling point (3,3), for example, is estimated from the values of the wavefield at that sampling point and at the two neighbouring sampling point on either side—i.e., from the wavefield values at the sampling points (1,3), (2,3), (3,3), (4,3) and (5,3). Similarly, the derivative along the y-axis at sampling point (4,4), as a further example, is estimated from the values of the wavefield at that sampling point and at the two neighbouring sampling point on either side—i.e., from the wavefield values at the sampling points (4,2), (4,3), (4,4), (4,5) and (4,6). The wavefield values within the cell A are therefore estimated using the wavefield values at the points in the 6×6 grid of points shown in FIG. 8 (and in a 3-D case a 6×6×6 grid of sampling points would be used).

In equations (1) and (2), or in the Fourier-transform representations referred to above, the spatial wavefields are therefore local tricubic functions within each cell depending on discrete wavefield samples at points in the neighbourhood of the cell. Within any chosen cell, the operator integrals may be evaluated for each of the elementary polynomials composing the tricubic functions. Note that this evaluation is independent of the particular wavefield values at the cell vertices and it yields "weights" to be given to those wavefield samples at the vertices. The contribution of the cell in question to the future wavefield at any point is thus known and more particularly the individual contribution or weight of each point in the 6×6×6 extended cell influencing the chosen cell is also known. Repeating over all cells gives the total future wavefield at all points.

Note that the calculation just outlined is more than we require for the homogeneous medium. It is sufficient to choose a single point at which the future wavefield is wanted. The causality of the Green function then means that only certain cells within a domain of dependence will contribute. For the chosen output wavefield point it is possible to identify which initial wavefield points will contribute and to compute the weights to be given to these points. In this way the integral operators in equations (1) and (2) are discretized for the homogeneous medium. That is, the operators shown in equations (1) and (2) that act on a continuous variable are replaced by operators that act on a variable that is known only at certain locations.

The resulting discrete operators are called seed operators and they are characterized by the spatial sampling interval $\Delta x$ and the timestep $\Delta t$ as well as by the wavespeed or other properties of the medium.

There are four such operators, corresponding to the four integrals in equations (1) and (2). These are denoted as the A, B, C and D operators, where A corresponds to the second integral in eq. (1) and thus has the Green function as its kernel. It is the operator that gives the contribution of the initial velocity $v_0$ to the final wavefield u.

Operators B and D correspond the first integral in equation (1) and the second integral in equation (2). These are therefore the same, though we keep their notation distinct for a later purpose.

Operator C corresponds to the first integral in equation (2). It is the most singular of the operators, as it relates to the second time derivative of the Green function. It gives the contribution of an initial wavefield $u_0$ to the final velocity v.

Upscaling and Self Reproduction of Seed Operators

The operator corresponding to a larger timestep than $\Delta t$, for example corresponding to a double timestep $2\Delta t$ is obtained from the discrete seed operators by discrete convolution. For example, the compound operator A' that corresponds to the operator A of equation (1), but that has a timestep of $2\Delta t$ is obtained from the original operators for a timestep $\Delta t$ as A'=BA+AD. This can be seen by taking the field at $\Delta t$ to be the new initial condition and applying equations (1) and (2) again (i.e. by recursion).

After this compounding step, the new discrete operators will be wider in space than the original ones by a factor of two. By saying that an operator is "wider" in space, it is meant that the operator involves more cells. The timestep will be $2\Delta t$, but the spatial sampling interval will still be $\Delta x$.

Now an upscaling step is performed, which is essentially a type of resampling step. The operators are to be applied to long-wavelength data where very little change occurs over the interval $\Delta x$. Therefore, every second point (say every even point) in the input data can be represented by simple interpolation from the alternate (say odd) points. It is natural, although not essential, to choose the tricubic interpolation method that was described above to interpolate the odd-point data values for the even-point values.

FIG. 1 shows a data resampling step, in accordance with an embodiment of the present invention. The data resampling step that leads to operator upscaling. Matrix S is called the resampling matrix. FIG. 1 shows how, in accordance with an embodiment of the present invention, upscaling may work in one-dimension (1D). The row vector of stars represents a double-length compound operator such as the operator A' above. The row vector of FIG. 1 includes 13 operator points, but the invention is not limited to this—although preferably the number of discrete operator points is odd, so that there is a definite centre point that can act as an output point. The column vector at far right represents the input data, i.e. the initial wavefield for the timestep being taken, sampled at a spatial sampling interval $\Delta x$. The boxed dots in the data vector represent the odd samples at spacing $2\Delta x$, which are judged sufficient to represent the data in view of the slow variation with position of the data. The simple dots are the even samples, which are considered to be derivable by interpolation from the odd samples. The matrix between the row and column vectors is an interpolation matrix, which is known from the particulars of the cubic interpolation scheme (or other interpolation scheme) used. This is called the resampling matrix S. Some rows of the resampling matrix have a single entry of unity, since these multiply the retained boxed-dot odd data samples. Other rows of the resampling matrix define the interpolated even data values. These rows of S have six entries denoted a-f, each of which can be assumed to be non-zero, symbolizing the six extended-cell weights in 1D, and other entries in these rows are zero.

Note that the brackets on the column vector at right delimit the original data-vector support of the operator A'. Also note that in order to define the first even sample from the boxed-dot odd samples, it is necessary to extend the support by two boxed-dot odd samples as shown so that three boxed-dot odd samples are available on either side of the first even sample (assuming that the value at an even sample is interpolated using the values of 6 odd samples). This extension occurs at both ends of the operator. Thus, although the resampling scheme reduces the number of relevant data samples, it does not do so by a factor of two due to this end-point effect.

The dimensions of S are indicated in FIG. 1 as N_cmpd_f×N_cmpd_c, where cmpd_f means 'compound fine' and cmpd_c means 'compound coarse' in reference to the spatial increment before and after this step.

The resampling matrix S is explicitly known from the cubic interpolation scheme and is independent of the specific data values. Hence, right-multiplication of the compound operator A' by the matrix S yields a new operator for a spatial increment $2\Delta x$ and timestep $2\Delta t$. This completes the upscaling step.

There is no natural length scale in a homogeneous medium, so the discrete operators A, B, C and D at $(\Delta x, \Delta t)$ and those at $(2\Delta x, 2\Delta t)$ should have the same form, neglecting numerical errors and scaling. This can be used for quality control.

Inhomogeneous Media.

Figure 2:
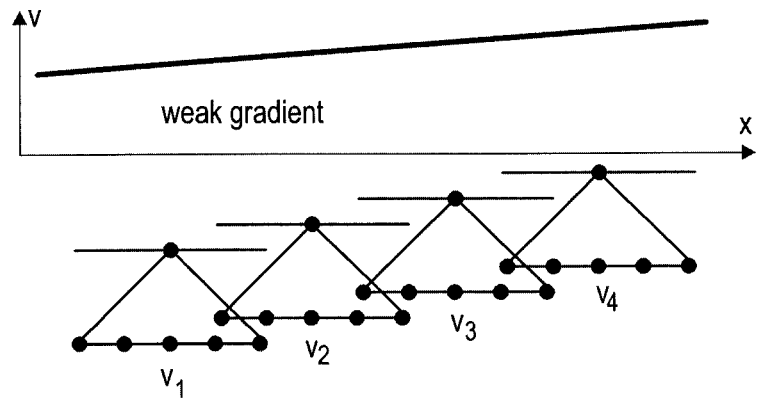
FIGS. 2(a) and 2(b) are schematic illustrations of the generation of compound operators.
Figure 2:
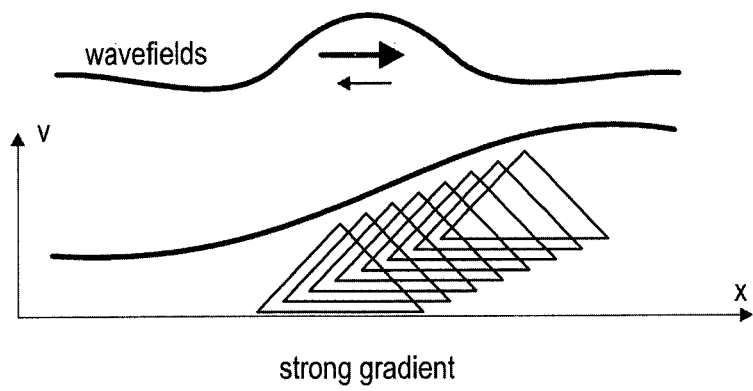

FIGS. 2(a) and 2(b) are schematic illustrations of the generation of compound operators. FIG. 2(a) depicts the way in which compounding neighbouring discrete seed operators for the different wavespeeds of an inhomogeneous medium builds up more complex operators. FIG. 2(b) depicts the case of a higher gradient causing noticeable backscattering and transmission loss, effects embodied in the compound operators.

As schematically shown in FIG. 2(a), seed operators that have a small spatial sampling step (and a small time sampling step) are initially defined. FIG. 2(a) shows 4 seed operators, each of which uses data from 5 sampling points spaced along the x-axis. The wavefield velocity v increases slowly with x, so that the first seed operator is at a location having a first value $v_1$ of the wavefield velocity, the second seed operator is at a location having a second value $v_2$ of the wavefield velocity and so on. The operators are closely spaced in the x-direction, so that the sampling points used to define one seed operator overlap with the sampling points used to define a neighbouring seed operator.

FIG. 2(b) again shows seed operators represented as triangles (the sampling points used to define the seed operators are omitted from FIG. 2(b) for clarity). The operators in FIG. 2(b) are more closely spaced than in FIG. 2(a), and this is because the velocity gradient (i.e., the rate of change of velocity v with position x across the medium) is greater in FIG. 2(b) than in FIG. 2(a).

Figure 3:
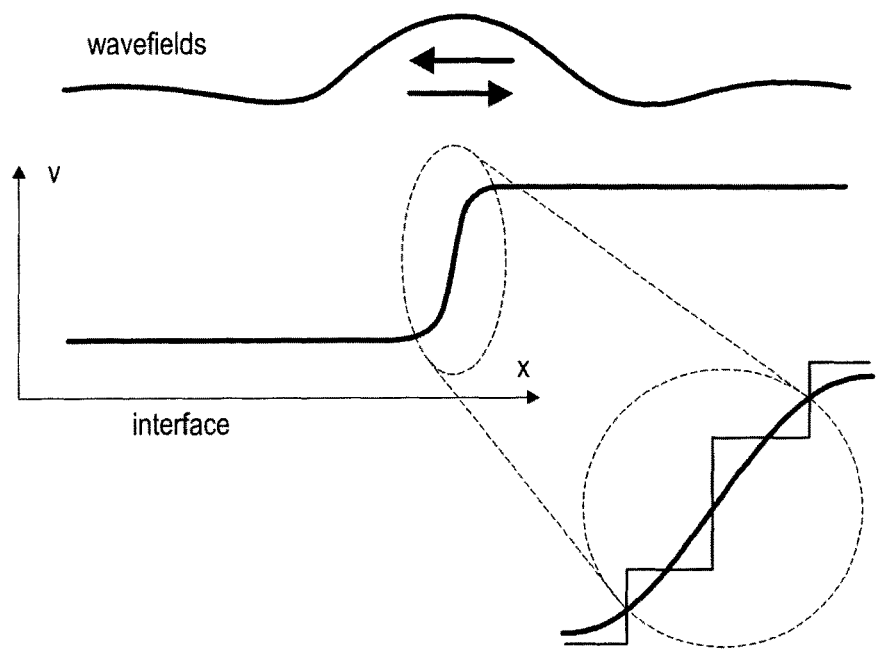
FIG. 3 is a schematic illustration of a high gradient zone.

An extreme case is depicted in FIG. 3. Here a narrow high-gradient zone lies between two homogeneous media. For waves of sufficiently long wavelength the high-gradient zone is indistinguishable from a true interface.

Given the bounding wavespeeds and the width of the transition shown in FIG. 3, a simple back of the envelope calculation will yield an estimate of how small $\Delta t$ must be for the medium to appear locally homogeneous inside the high-gradient zone. This defines the fine scale at which seed operators must be formed. (The "fine scale" may be thought of as the scale beyond which making the scale even finer has no significant effect on the results at the coarse scale.) The numerical example given below uses such information, though first a practical point must be made.

The local-homogeneity requirement obviously means that at the finest scale a very tiny sampling interval is to be used inside the gradient zone. This implies that a very large number of distinct seed operators will, be needed, one for each fine-scale point in the gradient. To avoid this, a staircase model shown as an insert in FIG. 3 may optionally be adopted. The gradient zone is divided into a number N of homogeneous slices, say eight. Thus, while a large number of fine-scale points lie inside the gradient, only a small number of distinct seed operators are involved. In each slice, all seed operators are the same, as the material properties are considered to be constant throughout the slice. Thus, N+2 distinct seed operators are required—one for the low velocity homogenous region below the interface, one for the high velocity homogenous region after the interface, and one for each of the N slices in the gradient zone. (Although the slices are referred to as "homogeneous slices", this does not require that each slice is completely homogenous, and some variation in properties such as the wave velocity will occur over a slice. The degree of variation in properties such as the wave velocity that may occur over a slice is for example preferably less than 10% or even less than 5%. In most application, a degree of variation in properties over a slice that is between 1% and 10% will provide acceptable results (with there being little further benefit in reducing the degree of variation over a slice below 1%).

Figure 4:
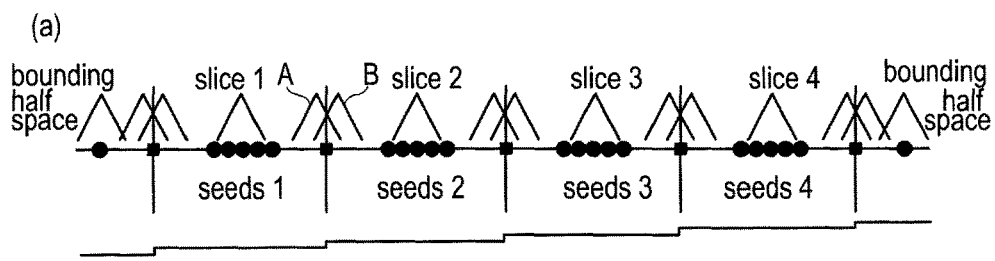
FIGS. 4(a) and 4(b) are schematic illustrations of compounding operators.
Figure 4:
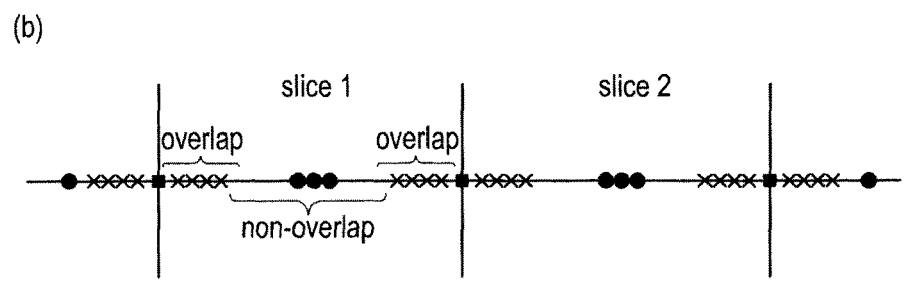

FIG. 4 indicates the first step of compounding in this staircase model. FIG. 4(*a*) shows the original seed operators (depicted as dots), and the way in which in compound operators (depicted by ^) with a larger timestep than the seed operators are built up from a number (in this example 5) of the seed operators. As can be seen, the support of some operators overlaps with neighbouring slices or the homogeneous bounding media—for example, for compound operators A and B some of their seed operators are from slice 1 and some of their seed operators are from slice 2.

During the first compounding step there will be coupling between slices and the situation in FIG. 4(*b*) arises. FIG. 4(*b*) shows the results of the first compounding step, which produces compound operators at locations along the x-axis, denoted by a dot or a cross, or by a square for those lying at slice interfaces As shown in FIG. 4(*b*) there are "overlap portions" at the limits of each slice or the bounding media, where a compound operator obtained in the first stage of compounding is supported by seed operators from two slices (or by seed operators from one slice and one of the homogeneous bounding media). In the centre of each slice there is a non-overlap portion where the compounding only involves the seed operator of that slice (operators at locations in these regions are denoted by dots), and the compound operators in the non-overlap portions are the same as one another—since they were all created by compounding the original seed operators for that slice.

The number of distinct operators is increased in this compounding operation, because a compound operator in an overlap portion of a slice was created using seed operators from that slice and using seed operators from a neighbouring slice (or from that slice and one of the homogeneous bounding media), and so are not the same as the compound operators in the non-overlap portion of that slice. The total number of distinct operators is still modest, however, since the width of the overlap zones is the same as the width of the seeds and only one compounded seed is need for the many points of each non-overlap portion.

Now an upscaling step is performed, for example as described in FIG. 1, to increase the spatial step of the compound operators.

The compounding and upscaling process may then be repeated as many times as desired. That is, there may be another compounding step, in which the compound operators obtained in the first compounding step themselves act as seed operators in the generation of new compound operators. This is followed by another upscaling step, to increase the spatial step of the new compound operators. The sequence of a compounding step (using the operators obtained in the previous compounding step as new seed operators) and an upscaling step may be repeated as often as necessary to obtain final compound operators having a desired timestep and a desired spatial step.

The non-overlap portions diminish in size in each successive compounding step and at some stage they are extinguished, leaving a sequence of distinct operators. By this stage, however, $\Delta x$ has become large enough through the doubling of the spatial step in each upscaling step that only a moderate number of distinct operators exists.

Applications and Implementation
  (a) Embodiments of the present invention may be used to create coarse-scale operators embodying fine-scale structure of some important Earth feature, these coarse-scale operators being linkable to an existing finite-difference method. An example of such an Earth structure is a rugose top of salt interface, an important situation for reverse-time migration (RTM) and subsalt imaging.
  (b) Embodiments of the present invention may be used to model an entire volume. The timestep flexibility here introduces new considerations, such as the domain decomposition question, which will have different outcomes compared to existing modeling methods.
  (c) Embodiments of the present invention may be linked with the discrete boundary operators described in UK patent application GB 2 478 574. This may be done to create boundary conditions for finite domains.
  (d) In some embodiments, the upscaling concept may be applied to such boundary operators when they are considered as part of a larger boundary-zone operator incorporating sub-grid structure near the boundary.
  (e) The operators for a homogeneous region are hollow if the timestep is large enough. "Hollow" as used herein means that the elements of a discrete operator are zero for grid points closer to the centre than some velocity-dependent radius. In some embodiments, this feature may be used to provide efficiency in implementations.
  (f) Embodiments of the present invention may be used to compute partial wavefield operators. For example, operators that propagate only the P or only the S waves through a volume. This would be achieved at the seed-operator stage, where only the plane-wave components corresponding to the desired wave type would be used on the Fourier synthesis side.
  (g) In general, upscaled operators are dense, but compact in space. Their implementation as 3D convolution operators is potentially an application for new computational hardware, in particular FPGAs. When combined with the large timestep and upscaling ideas, this hardware possibility suggests a potentially very different landscape for seismic processing based on wavefield modeling.

Example: Simple 1D Reflection and Transmission from a High Gradient Zone Representing an Interface In this example, the high-gradient interface zone of FIG. 3 is 1 meter wide, and the homogeneous media on either side have wavespeeds of 1500 and 4500 m/s respectively. Eight staircase slices are taken through the high-gradient interface zone, making ten different media—and ten different seed operators—when the two homogeneous bounding regions are included.

The objective is to build coarse-scale operators with $\Delta x$=4 m and $\Delta t$=4 ms. For these operators the high-gradient zone is narrower than the wavefield sampling length and so the high-gradient zone is expected to behave like a true discontinuity.

The initial seed operators were defined with these $\Delta x$ and $\Delta t$ values divided by $2^p$, where p=14. In other words, 14 steps of upscaling will be taken to obtain the desired coarse scale operators from the initial seed operators. As the fine-scale seed $\Delta x$ and $\Delta t$ values are 16,384 times smaller than the coarse-scale ones, the fine-scale seed $\Delta x$ value is very fine compared to the width of the high-gradient-zone. This is an extreme scale difference, suggested by the back of the envelope calculation that was referred to earlier. The practical staircase model is distinct from that back of the envelope argument and may permit less extreme parameters, but here the seeds are still defined in this way in order to demonstrate the fidelity of the 14-step upscaling.

The initial seed operators were compounded and upscaled as described above, to produce new operators. These new operators were then compounded and upscaled, and the process of compounding and upscaling the operators obtained in the previous compounding and upscaling process was repeated until the compounding and upscaling process had been carried out a total of 14 times. During the upscaling process, the non-overlap portions of the slices, defined earlier, were extinguished at step 7. Continuing to step 14 produced the upscaled operators shown in FIGS. 5(a) to (d). The operators shown in FIGS. 5(a) to (d) correspond to the operators B, A, C and D respectively, and have a spatial step $\Delta x$=4 m and a time step $\Delta t$=4 ms. Each operator in this example has width 35 sample points, though as FIGS. 5(a) to 5(d) show the most significant nonzero values of the operators are confined to a narrower central region.

Each of FIGS. 5(a) to (d) shows 12 views of its respective operator, corresponding to twelve wavefield sample points at 4 m spacing and straddling the interface zone (the high-gradient zone). The left-hand edge of the 1 m interface zone lies at the location of the fifth of the twelve views (second row, middle view).

The first and last pairs of operators for each of A, B, C and D lie entirely within the homogeneous bounding regions and they do not 'see' the interface.

Figure 5A:
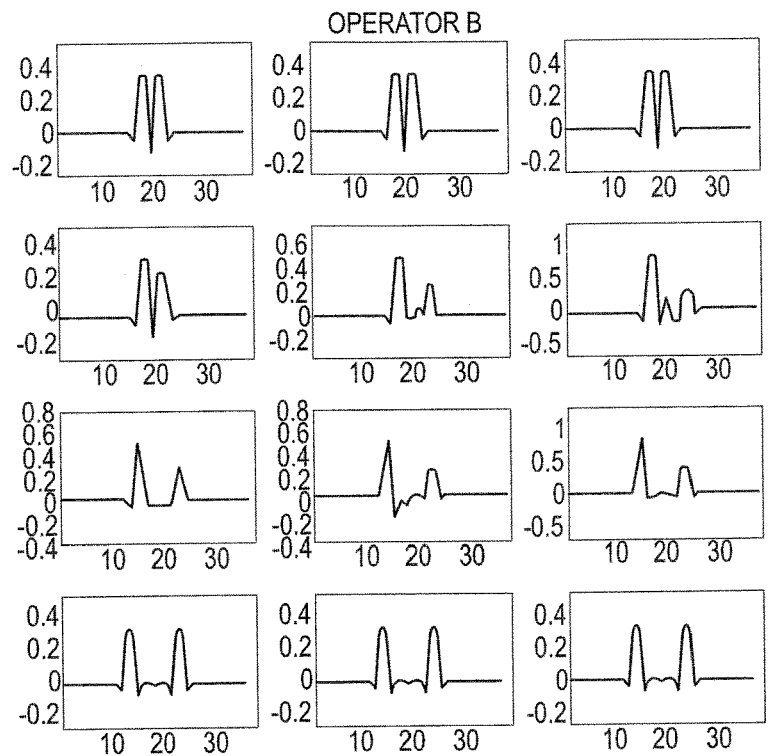
FIGS. 5(a) to 5(d) illustrate operators obtained by a method in accordance with an embodiment of the present invention.
Figure 5B:
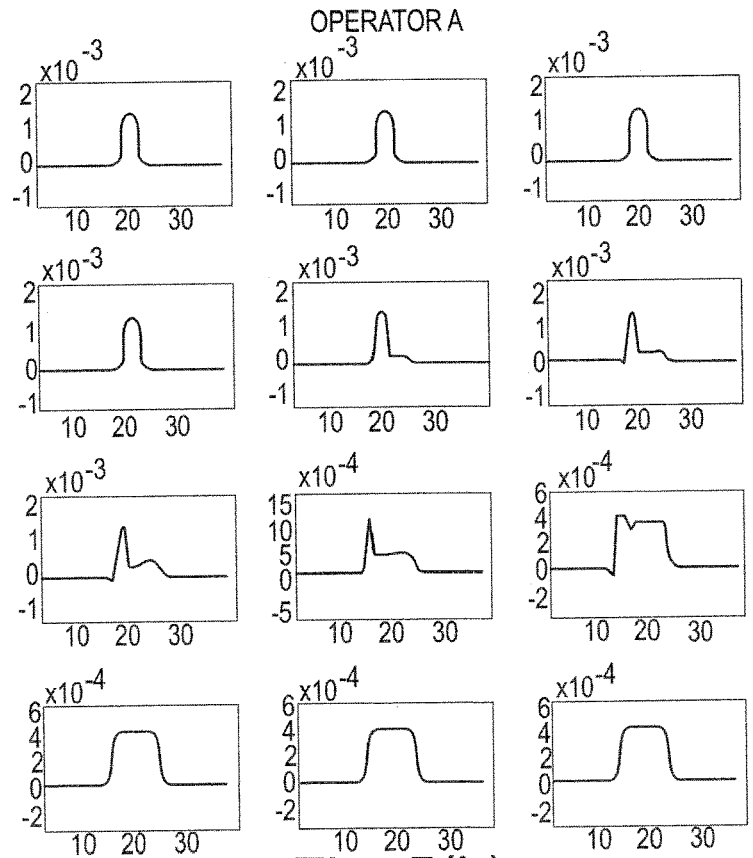

Considering operator A in FIG. 5(b), we see that at left and at right of the high-gradient zone it is a discrete version of the 1D Green function, which is a boxcar function. It is three times wider on the right of the high-gradient zone than on the left of the high-gradient zone because the wavespeed there is three times higher (4500 rather than 1500 m/s). Operator A undergoes a monotonic transition from one Green function to the other as the interface zone is crossed.

Figure 5C:
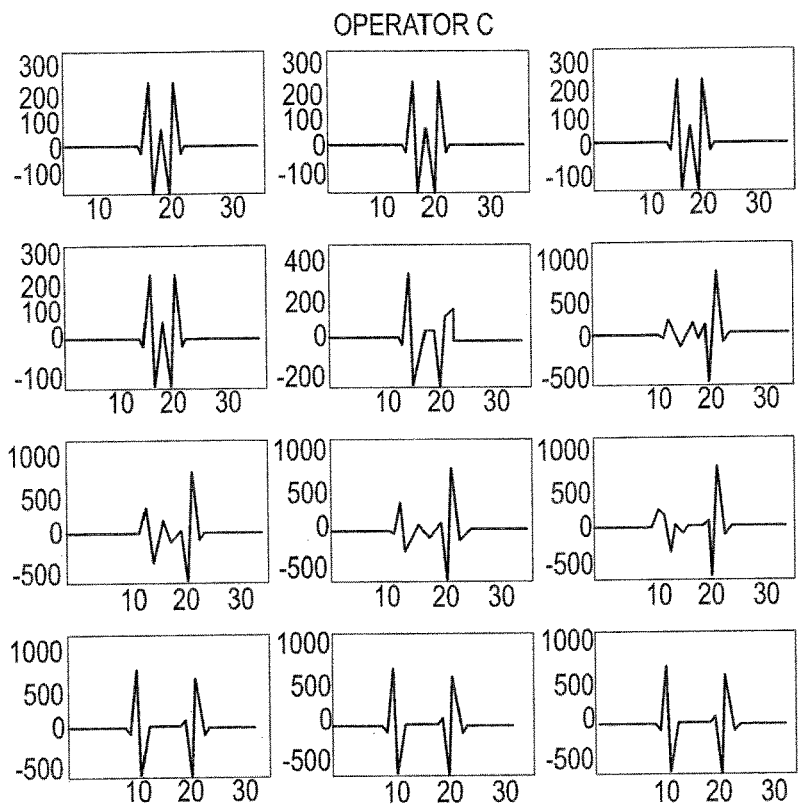
Figure 5D:
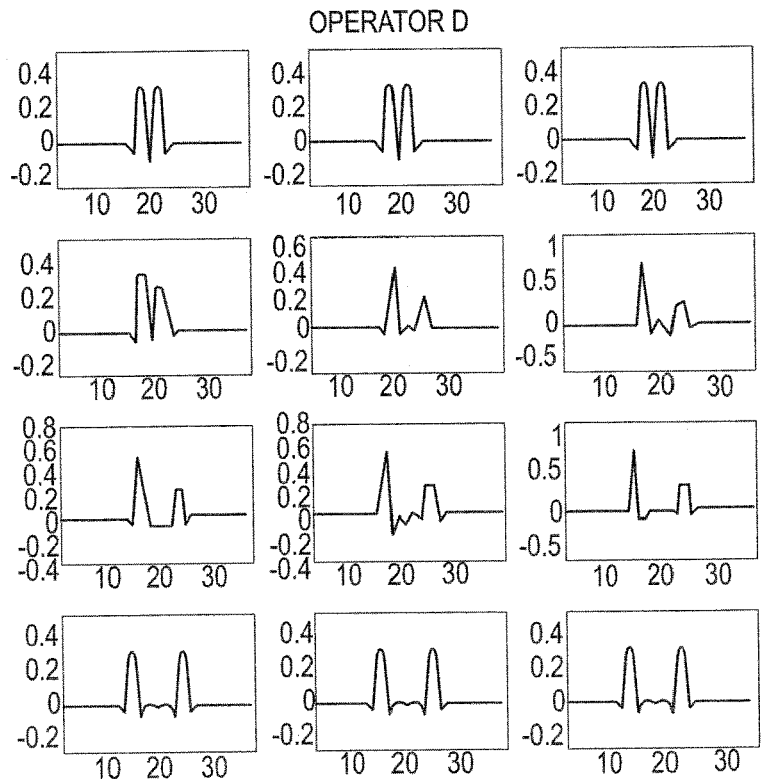

Note that operators B and D in FIGS. 5(a) and 5(d) are essentially the same, as they should be. This is a quality measure for the numerical fidelity of the method.

Operator C in FIG. 5(c) is the one which is most sensitive to the interface. It is the most oscillatory and its effect on long waves is created by the fine balancing of its positive and negative swings, so they must be accurate.

FIGS. 6(a) and 6(b) shows the effect of applying the operators in FIGS. 5(a) to 5(d) to synthetic initial data. The left-hand edge of the high-gradient interface zone is located at point 75 along the x axis in FIGS. 6(a) and 6(b). The initial field consisted of two plane waves of equal amplitude travelling in opposite directions and placed just to the left of the zone of influence of the interface in the upscaled operators. The initial velocity fields thus cancel ($v_o(x)$=0). At later times one would therefore expect to see three components in the wavefield—one arising from the plane wave that was initially travelling away from the interface and that propagates through the left hand homogeneous medium, one arising from the plane wave that was initially travelling towards the interface and being the part that is reflected by the interface to produce a left-travelling reflected wave, and one arising from the plane wave that was initially travelling towards the interface and being the part that is transmitted through the interface to produce a right-travelling transmitted wave that propagates into and through the right hand homogeneous medium.

The upscaled operators of FIGS. 5(a) to 5(d) were applied eleven times, making a total timestep of 44 ms.

There are three pulses in FIG. 6(a), which shows the wavefield u after 44 ms (u(x,t=44 ms)) and in FIG. 6(b) which shows the velocity v after 44 ms (v(x,t=44 ms)). The broken line in FIGS. 6(a) and 6(b) show the results of applying the upscaled operators of FIGS. 5(a) to 5(d) eleven times.

In FIGS. 6(a) and 6(b) the leftmost pulse is the initial wave that has travelled away from the interface. This defines the amplitude of the wave incident on the interface (since the initial field consisted of two plane waves of equal amplitude). The middle pulse is the reflected wave from the interface. It has half the amplitude of the incident wave. This is to be expected, as the reflection coefficient for a true discontinuity from 1500 to 4500 m/s is known to be 0.5.

The rightmost pulse in FIG. 6(a) or 6(b) is the transmitted wave, which is three times wider in space and has amplitude 3/2 times the incident wave. These properties are expected, as the wavespeed is three times higher in the homogeneous bounding medium at right and the transmission coefficient for a true discontinuity from 1500 to 4500 m/s is known to be 3/2.

For comparison, FIGS. 6(a) and 6(b) also show the analytic solution for the true-discontinuity model, plotted (as a full line) with an imposed spatial offset of two grid points to aid clarity.

FIG. 7(a) shows the same results for u(x) plotted without an imposed spatial shift between the result of applying the upscaled operators of FIGS. 5(a) to 5(d) eleven times and the analytic solution. It can be seen that the result of applying the upscaled operators of FIGS. 5(a) to 5(d) eleven times is virtually indistinguishable from the analytic solution.

FIG. 7(b) shows the result for u(x) when the location of the interface in the upscaled-operator solution (broken line, again for applying the upscaled operators eleven times) is placed 2 m to the right of the location used in the analytic solution (full line). This indicates the sensitivity of the results to the precise interface location. In FIG. 7(b) we see that the reflected wave and the transmitted wave are both late in the upscaled operator solution—these are derived from the wave that is initially travelling rightwardly towards the interface, and so they spend longer in the low-velocity medium than the waves in the analytic solution. Thus, the transmitted wave (right-most wave) has, in the 11 time steps, not moved quite as far to the right as has the transmitted wave in the analytic solution.

It is concluded from this example that the upscaling idea works in numerical practice for a rather extreme gradient model.

Figure 9:
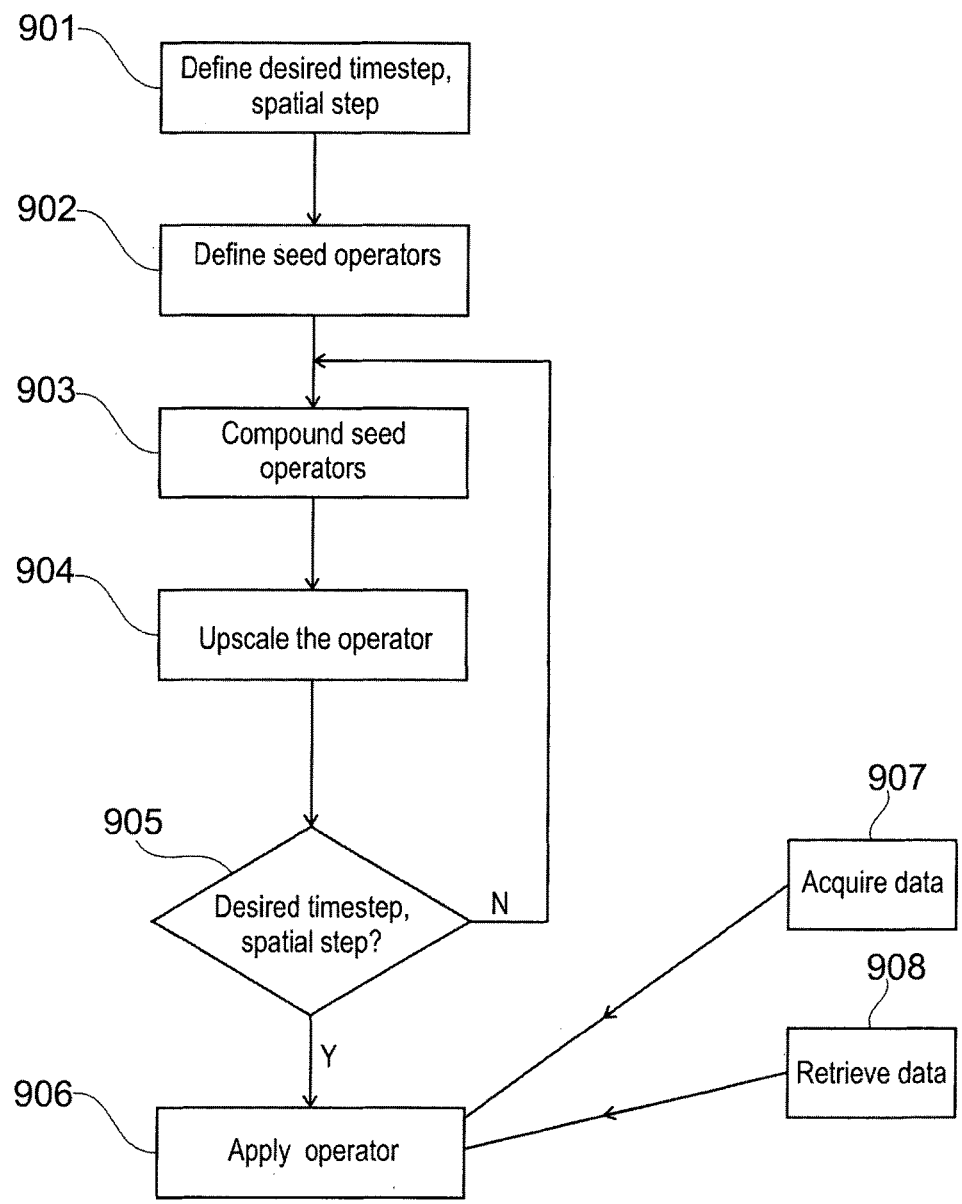
FIG. 9 is a block flow diagram showing steps of a method in accordance with an embodiment of the present invention.

FIG. 9 is a block flow diagram showing the principal features of a method in accordance with an embodiment of the present invention.

Features 901 to 905 of FIG. 9 relate to the creation of an operator having a desired timestep and a desired spatial step. Initially at 901 a desired timestep and a desired spatial step are defined. The operator is intended for use in processing data representing a wavefield propagating through a medium, and the desired timestep and desired spatial step are based on one or more properties of a region of the medium and/or of the waves therein.

At 902 seed operators are defined. As explained above, the seed operators defined at 902 have an initial timestep that is less than the desired timestep and have an initial spatial step that is less than the desired spatial step.

At 903 two or more seed operators are compounded as described above to obtain a discrete operator having a timestep greater than the initial timestep. This operator is then upscaled at 904 as described above to increase the spatial step and thus result in an operator having a spatial step greater than the initial spatial step and having a timestep greater than the initial timestep.

At 905 a determination is made whether the operator has a time step and a spatial step that are equal to, or greater than, the desired timestep and the desired spatial step respectively. If the result of 905 is a "no" determination, the process of compounding the operators and upscaling the operators is repeated until an operator having the desired timestep and the desired spatial step is obtained.

The operator may then be applied to the data, as indicated at 906. The data may be data that have been acquired at 907, or the data may be pre-existing data that were acquired at a previous time and that have been retrieved from storage at 908. (The features of acquiring/retrieving data may be carried out before, after, or in parallel with the features of generating the operator.)

The operator may for example be applied to the data at 906 to propagate the acquired/retrieved data backwards in time in reverse-time modeling, to recreate the wavefield at one or more earlier times.

Once a recreated wavefield has been estimated, this recreated wavefield can then be used in further processing steps. For example, the recreated wavefield may be used in the determination of one or more wavefield parameters relating to one or more physical properties of the medium. This may be done using any suitable wavefield processing technique. The invention is expected to be able to provide better quality wavefields than existing wavefield estimation techniques, and accordingly a wavefield obtained by the invention should, when subjected to further processing, provide a more accurate determination of wavefield parameters relating to physical properties of the medium.

As one example, if the recreated wavefield represents a wavefield that has been reflected by a feature in the medium, information about a reflection coefficient of the feature may be obtained from the recreated wavefield using known techniques.

It should be noted that the method of the invention is not limited to the specific features shown in FIG. 9. For example, if it is known how many times the features of compounding and upscaling, the operators must be carried out in order to obtain an operator having the desired timestep and the desired spatial step. The method of FIG. 9 could then be implemented to include updating a counter every time the features of compounding and upscaling are carried out, and feature 905 of FIG. 9 could then be replaced by a feature of inspecting the counter to see whether the required number of iterations had been carried out.

Figure 10:
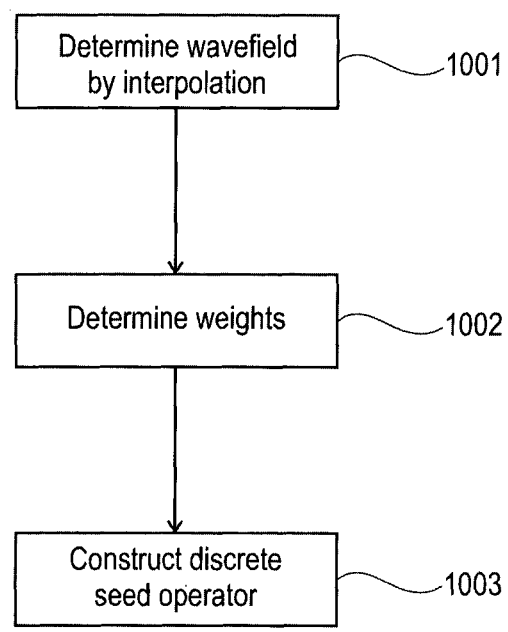
FIG. 10 is a block flow diagram showing steps of another method in accordance with an embodiment of the present invention.

FIG. 10 is a block flow diagram showing the principal features of a method in accordance with an embodiment of the present invention for defining a seed operator. The operator is initially defined as an integral, of a function of the wavefield, over a volume, but this definition assumes that the wavefield is a continuous variable and that its value is known everywhere. This assumption is not correct in the present case, since the wavefield has been sampled at discrete sampling locations, and its value is known only at these sampling locations. It is therefore necessary to define a discrete (or discretised) seed operator, so that the operator is defined in terms of wavefield values at known sampling locations.

At 1001, values of the wavefield are estimated at points different from the wavefield sampling points. The value of the wavefield as a point that is not a wavefield sampling point is estimated by interpolation from values of the wavefield at wavefield sampling points nearby to the point where the wavefield is to be estimated. The estimation may for example use local tricubic interpolation from values of the wavefield at nearby wavefield sampling points in a 6×6×6 extended cell as described above with reference to FIG. 8, but the invention is not limited to this. The interpolation process is repeated for every point where it is desired to estimate the wavefield value. (It should be noted that the reference to estimating a "value" of the wavefield at a point does not indicate that the invention is limited to estimating a single quantity at that point—for example it may be desired to estimate both the value of the wavefield and the value(s) of one or more derivatives of the wavefield.)

Next, at 1002, a respective weight is determined for each wavefield sampling point. As explained with reference to FIG. 8, this is done by identifying which wavefield sampling points contribute to the operator, and determining weights to be given to those points.

The discrete seed operator can then be constructed at 1003, as a weighted summation of wavefield values at the discrete wavefield sampling points.

Figure 11:
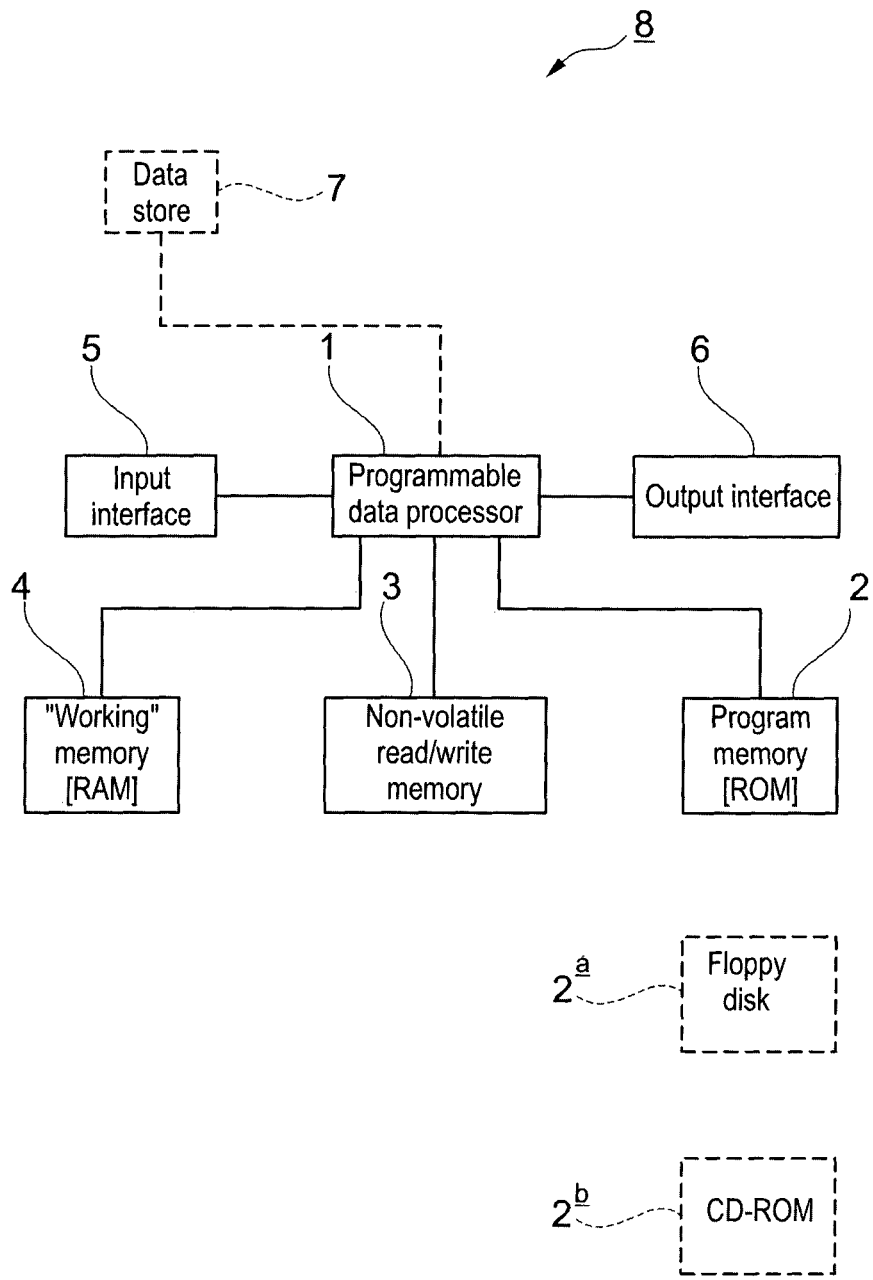
FIG. 11 is a schematic block diagram of a system in accordance with an embodiment of the present invention.

FIG. 11 is a schematic block diagram of a programmable apparatus 8 according to an embodiment of the present invention. The apparatus comprises a programmable data processor 1 with a programme memory 2, for instance in the form of a read-only memory (ROM), storing a programme for controlling the data processor 1 to perform any of the processing methods described above. The apparatus further comprises non-volatile read/write memory 3 for storing, for example, any data which must be retained in the absence of power supply. A "working" or scratch pad memory for the data processor is provided by a random access memory (RAM) 4. An input interface 5 is provided, for instance for receiving commands and data. An output interface 6 is provided, for instance for displaying information relating to the progress and result of the method. Data for processing may be supplied via the input interface 4, or may alternatively be retrieved from a machine-readable data store 7.

The programme for operating the system and for performing any of the methods described hereinbefore is stored in the programme memory 2, which may be embodied as a semi-conductor memory, for instance of the well-known ROM type. However, the programme may be stored in any other suitable storage medium, such as magnetic or optical data carrier 2a, such as a "floppy disk", CD-ROM or DVD-ROM 2b.

While the principles of the disclosure have been described above in connection with specific apparatuses and methods, it is to be clearly understood that this description is made only by way of example and not as limitation on the scope of the invention.

What is claimed is:

1. A method of processing data representing a wavefield propagating through an inhomogeneous medium, the method comprising:
   a) defining a desired timestep and a desired spatial step for a discrete operator, the desired timestep and desired spatial step being based on one or more properties of a region of the inhomogeneous medium and of the wavefield therein;
   b) defining a plurality of discrete seed operators having an initial timestep and an initial spatial step less than the desired timestep and the desired spatial step respectively;
   c) compounding two or more of the seed operators to obtain a discrete operator having a timestep greater than the initial timestep;
   d) upscaling the operator obtained in step (c) to obtain a spatial step greater than the initial spatial step;
   e) repeating steps (c) and (d) until an operator having the desired timestep and the desired spatial step is obtained;
   f) applying the operator having the desired timestep and the desired spatial step to the data representing the wavefield propagating through the inhomogeneous medium to propagate the data backwards in time thereby to recreate the wavefield at one or more earlier times; and
   g) using the recreated wavefield to determine a wavefield parameter relating to a physical property of the inhomogeneous medium;
   wherein the data representing the wavefield propagating through the inhomogeneous medium is produced by an energy source emitting waves into the inhomogeneous medium and one or more sensors measuring return waves.

2. The method of claim 1 wherein compounding two or more of the seed operators comprises compounding two or more of the seed operators to obtain a discrete operator having a timestep equal to n times the initial timestep.

3. The method of claim 2 where n=2.

4. The method of claim 1 wherein upscaling the operator comprises upscaling the operator to obtain a spatial step equal to n times the initial spatial step.

5. The method of claim 1 wherein defining the seed operators comprises defining two or more regions in the inhomogeneous medium, and defining a respective seed operator for each region.

6. The method of claim 5 wherein each of the two or more regions has a width selected to be such that at least one property of the inhomogenous medium is substantially homogenous over the region.

7. The method of claim 6 wherein the at least one property of the inhomogeneous medium includes a wave propagation velocity.

8. The method of claim 5 wherein the regions are defined such that at least one property of the inhomogeneous medium has a first value in one region and a second, different value in a second region adjacent to the first region.

9. The method of claim 1 wherein the wavefield is a seismic, acoustic, or electromagnetic wavefield.

10. The method of claim 1 wherein values of the wavefield are known at a plurality of wavefield sampling points, and wherein at least one of the discrete seed operators is defined by:
    estimating values of the wavefield at points different from the wavefield sampling points by interpolation from values of the wavefield at wavefield sampling points; and
    determining a respective weight for each wavefield sampling point that corresponds to a discrete seed operator.

11. The method of claim 10 wherein the interpolation comprises local tricubic interpolation.

12. The method of claim 1 wherein the method is a processor-implemented method.

13. A computer-readable medium containing instructions that, when executed by a processor, cause the processor to carry out a method as defined in claim 1.

14. The method of claim 1, wherein the recreated wavefield is used to determine a reflection coefficient of a feature in the inhomogeneous medium.

15. An apparatus for processing data representing a wavefield propagating through an inhomogeneous medium, the apparatus adapted to:
    a) define a desired timestep and a desired spatial step for a discrete operator, the desired timestep and desired spatial step being based on one or more properties of a region of the inhomogeneous medium and the wavefield therein;
    b) define a plurality of discrete seed operators having an initial timestep and an initial spatial step less than the desired timestep and the desired spatial step respectively;
    c) compound two or more of the seed operators to obtain a discrete operator having a timestep greater than the initial timestep;
    d) upscale the operator obtained in step (c) to obtain a spatial step greater than the initial spatial step;
    e) repeat steps (c) and (d) until an operator having the desired timestep and the desired spatial step is obtained;
    f) apply the operator having the desired timestep and the desired spatial step to the data representing the wavefield propagating through the inhomogeneous medium to propagate the data backwards in time thereby to recreate the wavefield at one or more earlier times; and
    g) use the recreated wavefield to determine a refection coefficient of a feature in the inhomogeneous medium;
    wherein the data representing the wavefield propagating through the inhomogeneous medium is produced by an energy source emitting waves into the inhomogeneous medium and one or more sensors measuring return waves.

16. The apparatus of claim 15 and adapted to compound two or more of the seed operators by compounding two or more of the seed operators to obtain a discrete operator having a timestep equal to n times the initial timestep.

17. The apparatus of claim 16 where n=2.

18. The apparatus of claim 15 and adapted to upscale the operator to obtain a spatial step equal to n times the initial spatial step.

19. The apparatus of claim 15 and adapted to define the seed operators by defining two or more regions in the inhomogeneous medium and defining a respective seed operator for each region.

20. The apparatus of claim 19 wherein each of the two or more regions has a width selected to be such that at least one property of the inhomogeneous medium is substantially homogenous over the region.

21. The apparatus of claim 20 wherein the at least one property of the inhomogeneous medium includes a wave propagation velocity.

22. The apparatus of claim 19 and adapted to define the regions such that at least one property of the inhomogeneous medium has a first value in one region and a second, different value in a second region adjacent to the first region.

23. The apparatus of claim 15 wherein the wavefield is a seismic, acoustic, or electromagnetic wavefield.

24. The apparatus of claim 15, wherein values of the wavefield are known at a plurality of wavefield sampling points, and wherein the apparatus is adapted to define at least one of the discrete seed operators by:
- estimating values of the wavefield at points different from the wavefield sampling points by interpolation from values of the wavefield at wavefield sampling points; and
- determining a respective weight for each wavefield sampling point that corresponds to a discrete seed operator.

25. The apparatus of claim 15 and adapted to estimate values of the wavefield at points different from the wavefield sampling points by local tricubic interpolation.

* * * * *